No. 757,943. PATENTED APR. 19, 1904.
A. V. MESEROLE.
STORAGE BATTERY.
APPLICATION FILED JULY 13, 1903.
NO MODEL.

WITNESSES:
Edward Thorpe.
Walton Harrison

INVENTOR
Abraham V. Meserole
BY
Munn
ATTORNEYS

THE NORRIS PETERS CO., PHOTO-LITHO., WASHINGTON, D. C.

No. 757,943.

Patented April 19, 1904.

UNITED STATES PATENT OFFICE.

ABRAHAM V. MESEROLE, OF NEW YORK, N. Y.

STORAGE BATTERY.

SPECIFICATION forming part of Letters Patent No. 757,943, dated April 19, 1904.

Application filed July 13, 1903. Serial No. 165,224. (No model.)

*To all whom it may concern:*

Be it known that I, ABRAHAM V. MESEROLE, a citizen of the United States, and a resident of the city of New York, borough of Brooklyn, in the county of Kings and State of New York, have invented a new and Improved Storage Battery, of which the following is a full, clear, and exact description.

My invention relates to storage batteries, my particular object being to make an efficient and durable battery of comparatively light weight in which the mechanical strain is distributed by a novel arrangement of the electrodes and their supporting devices.

My invention further relates to the composition of the active material to be used in storage batteries.

Reference is to be had to the accompanying drawings, forming a part of this specification, in which similar characters of reference indicate corresponding parts in all the figures.

Figure 1:
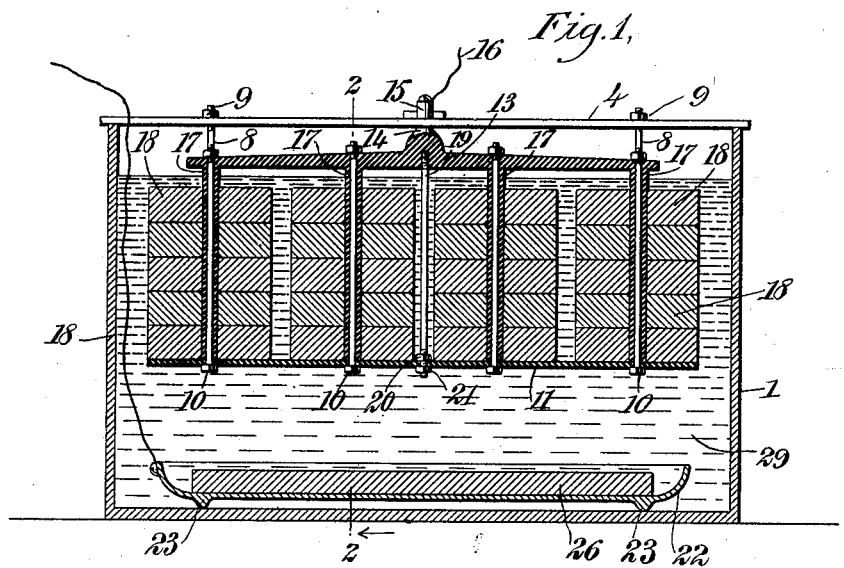
Figure 2:
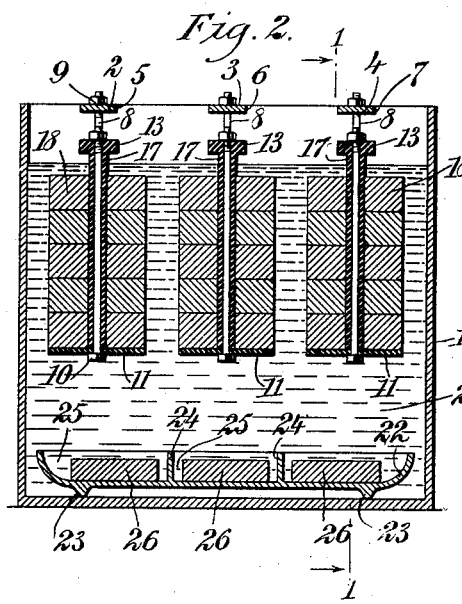
Figure 3:
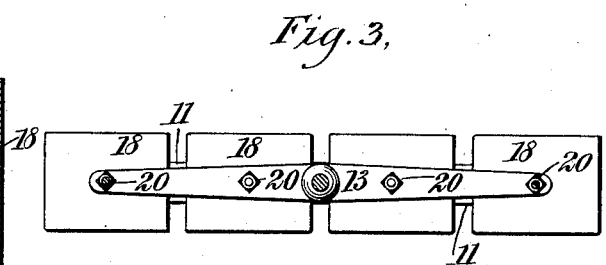
Figure 4:
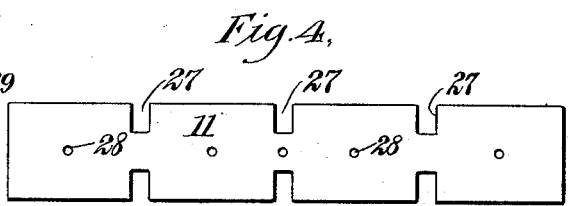
Figure 5:

Figure 1 is a vertical central section through the battery upon the line 1 1 of Fig. 2 looking in the direction of the arrow. Fig. 2 is a vertical cross-section upon the line 2 2 of Fig. 1 looking in the direction of the arrow. Fig. 3 is a plan view of one section of the so-called "oxid" or "oxygen" electrode removed from the battery. Fig. 4 is a plan view of one of the stirrup-strips for supporting the several tablets of active material, and Fig. 5 is a perspective view of one of the tablets of active material removed from the oxid-pole.

The containing vessel is shown at 1 and may be of any preferred material. Mounted upon this vessel are bridges 2 3 4, which may be made of metal inclosed in an insulating material, each being in the form of a bar engaging in notches 5 6 7 at the respective ends of the vessel 1. Depending from the bridges 2 3 4 are bolts 8, provided at their upper ends with nuts 9, engaging the bridges 2 3 4. Each of said bolts terminates at its inner end in a head 10, upon which rest stirrup-strips 11. Engaging the bolts 8 are a series of supporting-bars 13, made with stems 14. Upon these stems are binding-posts 15 for engaging leading-out wires 16. The support or conducting-bars 13 are provided with tubular fingers 17, extending some distance down into the containing vessel and through which the bolts 8 extend, as shown in Figs. 1 and 2. Encircling each of these tubular fingers 17 are numerous tablets or wafers 18 of active material. A central bolt 19, secured directly to each supporting-bar 13, aids to support the tablets of active material 18, resting upon the stirrup-plates 11. The arrangement thus described is what I term the "oxid" or "oxygen" electrode. The negative pole or hydrogen electrode consists of a tray 22, of metal, preferably bronze, provided with an insulated conductor to lead out the electric current in the usual manner. This tray 22 is integrally provided with partitions 24, which may extend up in the center, thereby forming a series of troughs 25, and in each of these troughs a slab of active material is placed, the arrangement just mentioned forming the so-called "hydrogen" electrode of the battery, as stated.

Returning to the construction of the oxid electrode, each stirrup-plate 11 is provided with recesses 27 and holes 28 for the several bolts and is disposed in line with the several stacks of tablets composing the oxid electrode. By the arrangement above described the battery is so constructed that the weight is so distributed that batteries of large size may be readily assembled or interchanged without danger of breaking down. The several sections secured to the bridge-bars are provided with independent terminal connections, which enables them to be connected up in any manner desired.

It will be seen in Figs. 1 and 2 that the conducting bridge-bars 13 are disposed some distance above the uppermost tablets 18. This arrangement is for providing for the expansion of the tablets which may occur in working. The conducting bridge-bars 13 and the hollow fingers 17 are made of the usual alloy of lead and antimony. The stirrup-plate may be made of any desired material; but for lightness I prefer hard rubber. The bolts 8 are preferably made of hard rubber sufficiently strong to stand considerable strain. They may be cemented in place by coating with hot tar when the battery is assembled.

In the above-described construction the several parts comprising the oxid electrode are positively retained securely in their several positions in case of weakness caused by undue oxidation of the tubular metallic fingers 17.

It should be noted that each and every tablet of active material is free to expand in all directions without displacing any other part or being subjected to any undue strain. The tablets are also made in several layers pressed together. By the above-described disposition of the several parts of the battery the fluid 29 is free to circulate around the active material, this being a desirable feature in rapid charging.

In the battery herein described the active materials composing the tablets of the oxygen electrode shown in the upper part of Figs. 1 and 2 are composed of peroxid of lead combined with about one per cent. of chemically-precipitated sulfur and about the same portion of a chemical precipitate of silver compound—such, for example, as an oxid. These materials are mixed, preferably, with water containing an acid sulfate. When properly mixed, they will form an insoluble mass, which I prefer to spread out upon thin lead sheets and then cut out the tablets of the size desired. By the use of the chemical constituents mentioned the tablets are rendered more effective and indestructible than when an ordinary oxid of lead is used. The tablets when thus made have also greater capacity for absorbing oxygen and retaining the same to transform into electrical force.

The tablets or slabs of active material used for the so-called "hydrogen" electrode in this battery are composed of lead, zinc, mercury, and copper, combined in any convenient manner, but preferably in the form of chemically-precipitated metal pressed into tablets. The quantity of zinc and mercury, by weight, should be about double that of the lead and copper. Experiment has shown that tablets thus formed are more satisfactory than either spongy lead or amalgamated zinc.

The electrolyte 29 may be any liquid suitable for electric storage batteries; but when the materials herein described are used I preferably employ dilute sulfuric acid.

Having thus described my invention, I claim as new and desire to secure by Letters Patent—

1. In a storage battery, a battery element consisting of a supporting-bar provided with depending tubular members, bolts threaded through said tubular members, a stirrup-plate mounted upon said bolts, and tablets of active material encircling said tubular members and resting upon said stirrup-plate.

2. In a storage battery, an electrode consisting of a bridge-bar, longitudinal metallic members connected therewith and tubular members depending therefrom, tablets of active material connected with said tubular members, and means for maintaining said tablets in engagement with said tubular members.

3. In a storage battery, an electrode consisting of a supporting-bar, means for sustaining the same, longitudinal metallic members connected with said supporting-bar, a stirrup-plate mounted upon said longitudinal members, and tablets of active material resting upon said stirrup-plate.

4. In a storage battery, a battery element consisting of a bridge, a longitudinal supporting-bar connected therewith and provided with tubular members integral therewith and depending therefrom, a stirrup-plate disposed adjacent to the lower ends of said tubular members, bolts threaded through said stirrup-plates for the purpose of supporting the same, fastenings for securing said stirrup-plate to said supporting-bar, and tablets of active material mounted upon said stirrup-plate and engaging said depending tubular members.

5. In a storage battery, the combination of a metallic member provided with hollow metallic fingers, metallic rods disposed within said fingers and strengthening the same, tablets of active material provided with apertures and threaded upon said hollow metallic fingers, and a stirrup-plate mounted upon said metallic rods for supporting said tablets of active material.

6. In a storage-battery electrode, a conducting-bar provided with tubular fingers integral therewith, metallic rods disposed within said hollow fingers, tablets of active material encircling said hollow fingers, and a stirrup-plate connected with said metallic rods and supporting the weight of said tablets of active material.

7. In a storage-battery electrode, the combination of a plurality of vertical suspension members, means for supporting the same, a single stirrup-plate connected with said suspension members, and tablets of active material mounted upon said stirrup-plates and supported thereby.

8. In a storage battery, the combination of an electrode consisting of a plurality of metallic bridges serving as conductors, means for supporting said bridges, vertical members connected with said bridges and depending therefrom, separate members for strengthening said vertical members, stirrup-plates connected with said vertical members and supported thereby, and tablets of active material mounted upon said stirrup-plates and supported thereby.

9. In a storage battery, the combination of an electrolytic vessel, bridges of conducting material engaging the same and resting thereupon, suspension members connected with said bridges and supported thereby, mechanism for strengthening said suspension members, and tablets of active material detachably engaging said suspension members.

10. In a storage-battery electrode, the combination of a vertical suspension member, bridge mechanism of conducting material integrally connected therewith and from which the same is suspended, electric connections for said bridge mechanism, and means for securing tablets of active material upon said suspension member.

In testimony whereof I have signed my name to this specification in the presence of two subscribing witnesses.

ABRAHAM V. MESEROLE.

Witnesses:
 PETER J. KERNER,
 FRANK L. BROWNE.